United States Patent [19]

Shimizu et al.

[11] Patent Number: 5,449,417
[45] Date of Patent: Sep. 12, 1995

[54] R-FE-B MAGNET ALLOY, ISOTROPIC BONDED MAGNET AND METHOD OF PRODUCING SAME

[75] Inventors: Motoharu Shimizu; Motohisa Hasegawa, both of Kumagaya, Japan

[73] Assignee: Hitachi Metals, Ltd., Tokyo, Japan

[21] Appl. No.: 242,050

[22] Filed: May 13, 1994

Related U.S. Application Data

[60] Continuation of Ser. No. 20,455, Feb. 22, 1993, abandoned, which is a division of Ser. No. 816,238, Jan. 3, 1992, abandoned, which is a division of Ser. No. 416,974, Oct. 4, 1989, abandoned.

[30] Foreign Application Priority Data

Oct. 4, 1988 [JP] Japan ................... 63-250452
Jan. 10, 1989 [JP] Japan ...................... 1-3039
Aug. 21, 1989 [JP] Japan .................. 1-214606

[51] Int. Cl.$^6$ ............................. H01F 1/057
[52] U.S. Cl. ........................ 148/302; 75/244; 252/62.54
[58] Field of Search ............ 148/302; 420/83, 121; 75/244; 252/62.54

[56] References Cited

U.S. PATENT DOCUMENTS

| | | | |
|---|---|---|---|
| 4,402,770 | 9/1983 | Koon | 148/302 |
| 4,802,931 | 2/1989 | Croat | 148/302 |
| 4,851,058 | 7/1989 | Croat | 148/302 |
| 4,921,553 | 5/1990 | Tokunaga et al. | 75/244 |

FOREIGN PATENT DOCUMENTS

| | | |
|---|---|---|
| 0101552 | 2/1984 | European Pat. Off. . |
| 0106948 | 5/1984 | European Pat. Off. . |
| 0125752 | 11/1984 | European Pat. Off. . |
| 0229946 | 7/1987 | European Pat. Off. . |
| 0242187 | 10/1987 | European Pat. Off. . |
| 59-46008 | 3/1984 | Japan . |
| 59-64733 | 4/1984 | Japan . |
| 59-64739 | 4/1984 | Japan . |
| 59-163802 | 9/1984 | Japan . |
| 59-211549 | 11/1984 | Japan . |
| 63-232301 | 9/1988 | Japan . |

*Primary Examiner*—John Sheehan
*Attorney, Agent, or Firm*—Finnegan, Henderson, Farabow, Garrett & Dunner

[57] ABSTRACT

A rare earth-iron-boron permanent magnet alloy having a composition represented by the formula:

$$R_a Fe_b B_c M_d,$$

wherein R represents one or more rare earth elements, M represents at least one element selected from the group consisting of Al, Si, Cu, Nb, W, V, Mo and Ta, 20% or less of Fe may be substituted by Co, and a, b, c and d are atomic % satisfying a: 10–15, b: balance, c: 4–8, and d: 10 or less, the magnet alloy having an average crystal grain size of 0.01–0.2 $\mu$m (0.2 $\mu$m or less in 90% or more by area of the crystal grains). This magnet alloy can be used to provide an isotropic bonded magnets which may be used of PM motors.

2 Claims, 9 Drawing Sheets

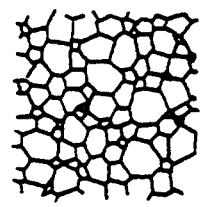 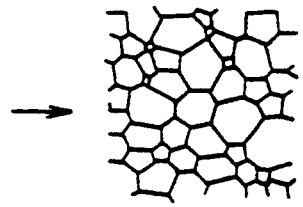 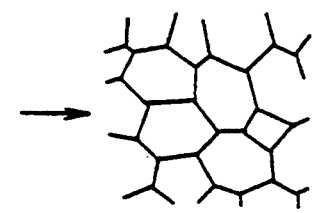
FIG.1(a)   FIG.1(b)   FIG.1(c)
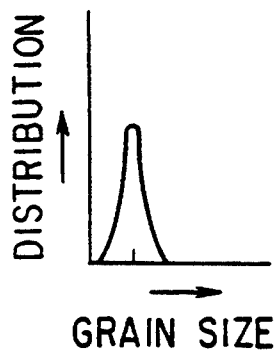 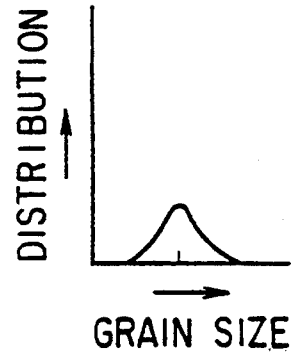 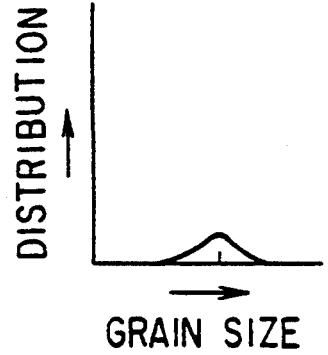

R-FE-B MAGNET ALLOY, ISOTROPIC BONDED MAGNET AND METHOD OF PRODUCING SAME

This application is a continuation of application Ser. No. 08/020,455, filed Feb. 22, 1993 now abandoned, which is a divisional of application Ser. No. 07/816,238 filed Jan. 3, 1992 now abandoned which is a divisional application of Ser. No. 07/416,974 filed Oct. 4, 1989 now abandoned.

BACKGROUND OF THE INVENTION

The present invention relates to a rare earth-iron-boron permanent magnet alloy having extremely improved heat resistance and magnetizability, and a method of producing it by a rapid quenching method. It further relates to a bonded rapid quench magnet suitable for PM (permanent magnet)-type motors capable of generating sufficient power at high temperatures, and a PM-type motor such as a stepping motor, a linear actuator, etc. for use in automobiles, office automation equipment, factory automation equipment, etc.

There are various types of permanent magnet-type motors thereinafter referred to simply as "PM-type motor"), in which permanent magnets are used for stators or rotors to generate an electromagnetic force in cooperation with current flowing through windings. Mainly from the aspects of power and cost performance, small PM-type motors generating a power up to 20 Watts use bonded ferrite magnet composed of ferrite magnet powder and binders, and those generating a power of 20-300 Watts use sintered ferrite magnets. On the other hand, large PM-type motors generating a power of 300-1700 Watts or higher use sintered ferrite magnets having high coercive forces.

As permanent magnets having better magnetic properties than ferrite magnets, rare earth-cobalt (R—Co) magnets and rare earth-iron-boron permanent magnets (R—Fe—B) are known, and these magnets have been used for PM-type motors.

The rare earth-iron-boron permanent magnet alloy having high energy product are generally produced by the following two methods:

The first method is a powder metallurgy method in which an ingot of magnet alloy is used as a starting material, and the same sintering process as in the conventional samarium-cobalt magnets is used to prepare a permanent magnet (Japanese Patent Laid-Open No. 59-46008). This method is a practical one since it can produce various shapes of magnets. In addition, since the rare earth-iron-boron permanent magnet alloy is pulverized to 3-10 μm and formed in a magnetic field, crystal grains in the permanent magnets are alligned with respect to their easy magnetization directions, whereby the permanent magnets are provided with a high residual magnetic flux density. For instance, a sintered magnet of $Fe_{77}Nd_{15}B_8$ shows a residual magnetic flux density Br of 12.1 kG, and a coercive force iHc of 7.3 kOe.

The second method is a rapid quenching method in which a thin ribbon prepared by a rapid quenching method such as a single roll method is used as it is or after heat treatment to provide a permanent magnet (Japanese Patent Laid-Open No. 59-64739). In the permanent magnet shown in the above reference, crystals of 20-400 nm in diameter are arranged isotropically, and the magnet shows a residual magnetic flux density Br of 8 kG, and a coercive force iHc of 13 kOe or so.

However, the rare earth-iron-boron permanent magnet alloys suffer from practical problems such that they are much more susceptible to temperature variation in residual magnetic flux density and coercive force than the samarium-cobalt magnets. Accordingly, part of Nd, a light rare earth element, is substituted by a heavy rare earth element such as Dy to enhance the coercive force, thereby reducing the temperature variation of magnetic properties. However, these magnets show poor magnetizability because of a large coercive force, and since they contain expensive heavy rare earth elements such as Dy, they are disadvantage in cost.

Further, the rare earth-iron-boron permanent magnet alloys prepared by a rapid quenching method are essentially isotropic, showing coercive force of several tens kOe. Accordingly, they should be magnetized in an extremely large magnetic field (100 kOe or more). As a result, usual elecromagnet methods are not used, and high-magnetic field generating apparatuses such as pulse magnetization apparatuses should be used for magnetization.

In these circumstances, magnets containing Co to improve Tc were proposed (Japanese Patent Laid-Open No. 59-64733). However, the addition of Co leads to a decrease in rectangularity of the B–H curve.

In the mean time, the bonded magnets of R—Fe—B magnet alloys include bonded sintered magnets comprising magnet powder prepared by a powder metallurgy method including pulverization and binders, and magnetically isotropic bonded rapid quench magnets comprising a magnetically isotropic magnet alloy flakes prepared by a rapid quenching method and binders (Japanese Patent Laid-Open No. 59-211549), and magnetically anisotropic bonded magnets comprising magnetically anisotropic magnet powder prepared by pulverizing hot-worked magnet and binders (Japanese Patent Laid-Open No. 63-232301).

Incidentally, in Japanese Patent Laid-Open No. 59-211549, the composition range of bonded rapid quench magnet is not described, and there are only two examples of compositions which are R=15, Fe=81, B=4 (by atomic %), R=20, Fe=76, B=4 (by atomic %).

It should be noted that there is an important morphological difference between the sintered magnet and the rapidly quenched magnet in an average crystal grain size. The sintered magnet has an average crystal grain size of 1-80 μm (Japanese Patent Laid-Open No. 59-163802), while the rapidly quenched magnet has an average crystal grain size of 0.02-0.4 μm (Japanese Patent Laid-Open No. 59-64739). This means that the average crystal grain size of the rapidly quenched magnet is close to about 0.3 μm, which is a critical size of a single magnetic domain, which contributes to high coercive force.

In such circumstances, EP 0,242,187 was recently published, which discloses a permanent magnet having a composition represented by the formula:

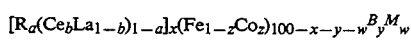

$$[R_a(Ce_bLa_{1-b})_{1-a}]_x(Fe_{1-z}Co_z)_{100-x-y-w}B_yM_w$$

wherein R is at least one rare earth element including Y and excluding Ce and La, and M is at least one selected from Zr, Nb, Mo, Hf, Ta and W, $5.5 \leq x < 12$, $2 \leq y < 15$, $0 \leq z \leq 0.7$, $0 < w \leq 10$, $0.80 \leq a \leq 1.00$, and $0 \leq b \leq 1$, the magnet consisting of a fine crystalline phase or a mixed phase of a fine crystalline phase and an amorphous phase. In Example 7 of EP 0,242,187, a thin ribbon of 9.5 Nd-8 B-4 Zr-bal. Fe prepared by a rapid quenching method shows, after an aging treatment at 700° C. for 10 minutes, the following temperature characteristics:

$$\frac{dBr}{dT} = 0.08 - 0.11\%/°C.$$

$$\frac{diHc}{dT} = 0.34 - 0.40\%/°C.$$

in a temperature range of 20°–110° C.

This reference mentions:

"The structure obtained by rapid cooling depends on the cooling condition and is amorphous or is composed of a mixed phase of amorphous and fine crystals. The fine crystalline structure or the mixed phase structure of amorphous and fine crystals, and the size of the constituent phases of the structure, can be further controlled by annealing, to enhance the magnetic properties. The magnetic properties are enhanced when at least 50% of the fine crystals has a size in the range of from 0.01 to less than 3 μm, preferably from 0.01 to less than 1 μm. The amorphous-free structure provides higher magnetic properties than the mixed phase structure.

"The annealing of a magnet rapidly cooled and solidified by the liquid-rapid cooling method is carried out at a temperature range of from 300° C. to 900° C. for 0.001 to 50 hours in an inert gas atmosphere or a vacuum. The rapidly cooled magnet having a composition according to the present invention and subjected to the annealing becomes insensitive to the conditions for rapid cooling, thereby stabilizing the magnetic properties."

However, the permanent magnets are required to have a good heat resistance at a temperature of 140° C. or higher for some applications such as motors disposed in automobiles. Although the permanent magnet of EP 0,242,187 shows a good heat resistance up to 110° C., it fails to meet the heat resistance requirement at a temperature of 140° C. or higher.

OBJECT AND SUMMARY OF THE INVENTION

Accordingly, an object of the present invention is to provide a rare earth-iron-boron permanent magnet alloy having improved magnetizability and heat resistance without largely deteriorating its magnetic properties, and a method of producing it.

Another object of the present invention is to provide a bonded rapid quench magnet having excellent heat resistance and magnetizability, and a method of producing it.

A further object of the present invention is to provide a permanent magnet-type motor using such bonded magnet.

Thus, the rare earth-iron-boron permanent magnet alloy according to one embodiment of the present invention has a composition represented by the formula:

$$R_aFe_bB_cM_d,$$

wherein R represents one or more rare earth elements, M represents at least one element selected from the group consisting of Al, Si, Cu, Nb, W, V, Mo and Ta, 20% or less of Fe may be substituted by Co, and a, b, c and d are atomic % satisfying:
- a: 10–15,
- b: balance,
- c: 4–8, and
- d: 10 or less, the magnet alloy having an average crystal grain size of 0.01–0.2 μm (0.2 μm or less in 90% or more by volume of the crystal grains).

The method of producing a rare earth-iron-boron permanent magnet alloy according to another embodiment of the present invention having a composition represented by the formula:

$$R_aFe_bB_cM_d,$$

wherein R represents one or more rare earth elements, M represents at least one element selected from the group consisting of Al, Si, Cu, Nb, W, V, Mo and Ta, 20% or less of Fe may be substituted by Co, and a, b, c and d are atomic % satisfying:
- a: 10–15,
- b: balance,
- c: 4–8, and
- d: 10 or less, comprises the steps of ejecting an alloy melt having the composition onto a roll rotating at 10–40 m/sec to produce a thin ribbon having an average thickness of 10–60 μm and an initial coercive force of 2000 Oe or less by a rapid quenching method; and subjecting the thin ribbon to a heat treatment at a temperature of 800° C. or lower.

The bonded rapid quench magnet having remarkably improved magnetizability and heat resistance according to a further embodiment of the present invention comprises (a) magnetically isotropic magnetic powder composed of an R—Fe—B—M magnet alloy, wherein R represents at least one rare earth element including Y in the range of 10–15 atomic %, B represents boron in the range of 4–8 atomic %, Fe represents iron in a balance amount, 20% or less of which may be substituted by Co, and M represents at least one element selected from the group consisting of Al, Si, Cu, Nb, W, V, Mo and Ta, and having an average crystal grain size of 0.01–0.2 μm (0.2 μm or less in 90% or more by volume of the crystal grains), and an average particle size of 1–1000 μm; and (b) 5–40 volume % of a binder.

The method of producing a bonded rapid quench magnet according to a still further embodiment of the present invention comprises the steps of:

(a) preparing an alloy melt having a composition represented by the formula:

$$R_aFe_bB_cM^d,$$

wherein R represents one or more rare earth elements, M represents at least one element selected from the group consisting of Al, Si, Cu, Nb, W, V, Mo and Ta, 20% or less of Fe may be substituted by Co, and a, b, c and d are atomic % satisfying:
- a: 10–15,
- b: balance,
- c: 4–8, and
- d: 10 or less;

(b) ejecting the alloy melt onto a roll rotating at 10–40 m/sec to produce a thin ribbon substantially composed of an amorphous phase and having an average thickness of 10–60 μm and an initial coercive force of 2000 Oe or less by a rapid quenching method;

(c) subjecting the thin ribbon to a heat treatment at a temperature of 550°–800° C.;

(d) pulverizing the heat-treated thin ribbon to an average particle size of 1–1000 μm; and (e) blending the resulting magnet powder with 5–40 volume % of a binder.

The permanent magnet-type motor using a permanent magnet in a stator and/or a rotor according to a still further embodiment of the present invention is a bonded rapid quench magnet having remarkably improved magnetizability and heat resistance and comprises (a) magnetically isotropic magnetic powder composed of an R—Fe—B—M magnet alloy, wherein R represents at least one rare earth element including Y in the range of 10–15 atomic %, B represents boron in the range of 4–8 atomic %, Fe represents iron in a balance amount, 20% or less of which may be substituted by Co, and M represents at least one element selected from the group consisting of Al, Si, Cu, Nb, W, V, Mo and Ta, and having a average crystal grain size of 0.01–0.2 μm (0.2 μm or less in 90% or more of the crystal grains), and an average particle size of 1–1000 μm; and (b) 5–40 volume % of a binder.

BRIEF DESCRIPTION OF THE DRAWINGS

FIGS. 1(a), (b) and (c) show the growing process of crystal grains and their particle size distribution;

DETAILED DESCRIPTION OF THE INVENTION

Figure 2:
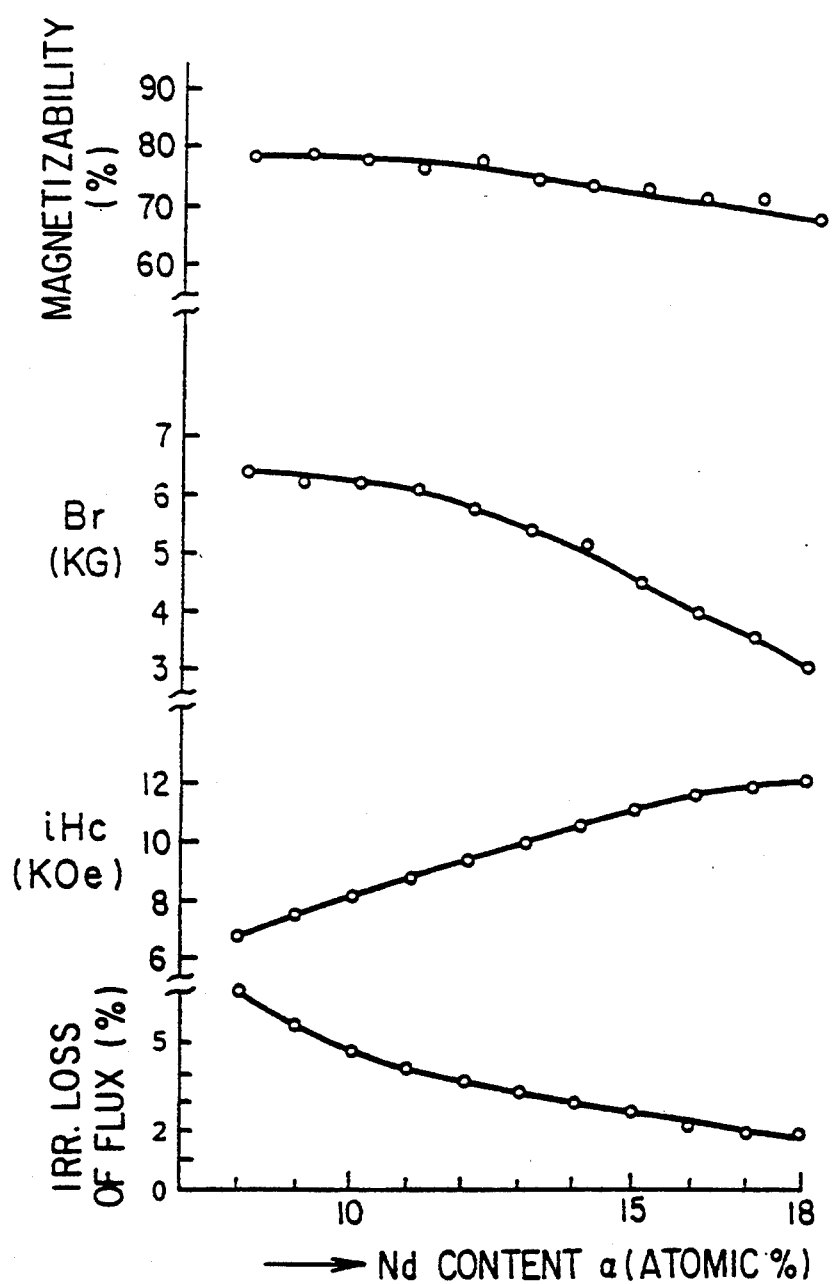
FIG. 2 is a graph showing the relations between an Nd content of the magnet $Nd_aFe_{93.3-a}B_{6.5}Si_{0.2}$ (by atomic %) of the present invention and magnetic properties.

In the present invention, the magnet powder which may be used has a composition represented by the formula:

$$R_aFe_bB_cM_d,$$

wherein R represents one or more rare earth elements, M represents at least one element selected from the group consisting of Al, Si, Cu, Nb, W, V, Mo and Ta, and a, b, c and d are atomic % satisfying:

a: 10–15,
b: balance,
c: 4–8, and
d: 10 or less.

When R is less than 10 atomic %, the irreversible loss of flux becomes 5% or more at an ambient temperature of 40° C., and when R exceeds 15 atomic %, the residual magnetic flux density Br of the magnet becomes lower than 4.5 kG. Thus, permanent magnets having excellent magnetic properties cannot be obtained outside the R range of 10–15 atomic %. The preferred range of R is 11.5–15 atomic %, in which the magnet shows an irreversible loss of flux lower than 4% at 140° C. The further preferred range of R is 12–15 atomic % in order that the magnet alloy shows a remarkably improved heat resistance. Incidentally, R may be used as a mixture such as Misch metal and didymium because they are easily available. R may not be a pure rare earth element, and it may contain inevitable impurities in permissible ranges.

With respect to B, when the B content is lower than 4 atomic %, the irreversible loss of flux of the magnet becomes 5% or more at an ambient temperature of 140° C., and when it exceeds 8 atomic %, the residual magnetic flux density Br becomes lower than 4.5 kG, thereby failing to provide permanent magnets with excellent magnetic properties.

In order to improve the magnetizability and heat resistance (expressed by an irreversible loss of flux which is lower than 5% at an ambient temperature of 140° C., and a permeance coefficient Pc=2), or to lower production costs, the rare earth-iron-boron permanent magnet alloy may contain at least one of the following additive elements. Since the improvement of the magnetizability and the heat resistance inevitably leads to the deterioration of a residual magnetic flux density Br or an irreversible loss of flux to some extent, the additive elements should be in the following amounts, if any.

Al: 5 atomic % or less,
Si: 5 atomic % or less,
Cu: 3 atomic % or less,
Nb: 3 atomic % or less,
W: 3 atomic % or less,
V: 3 atomic % or less,
Mo: 3 atomic % or less, and
Ta: 3 atomic % or less.

The preferred amounts of the additive elements are as follows:

Al: 0.05–4 atomic %
Si: 0.05–4 atomic %
Cu: 0.05–2.5 atomic %
Nb: 0.05–3 atomic %
W: 0.05–3 atomic %
V: 0.05–3 atomic %
Mo: 0.05–3 atomic %
Ta: 0.05–3 atomic %

When two or more additive elements are added, the total contents of the additive elements should be at most the largest upper limit of the additive elements.

Incidentally, besides the additive elements, the permanent magnet of the present invention may contain inevitable impurities in permissible amounts.

It is critical in the present invention that the magnet alloy has a crystal grain size in a particular range. It has been found that in the above composition range, the crystal grain size in a particular range can provide the bonded magnet with excellent magnetizability and heat resistance. Specifically, the optimum condition is such that the average crystal grain size is 0.01–0.2 μm, and 90% or more by area of the crystal grains have a grain size of 0.2 μm or less.

When the average crystal grain size is lower than 0.01 μm, the coercive force iHc is insufficient, and when it exceeds 0.2 μm, the crystal grains become too large, so that reverse magnetic domains may be generated, resulting in a decrease in iHc. Accordingly, the average crystal grain size should be 0.01–0.2 μm. The preferred average crystal grain size is 0.01–0.15 μm. In general, since the crystal grains grow during heat treatment, the heat treatment conditions such as temperature should be controlled to be 800° C. or lower.

Incidentally, the measurement of the crystal grain size is conducted by using a cut method or an X-ray method. In the former method, the procedure is relatively easy, but large deviations exist among measurement points, meaning that it fails to provide high measurement accuracy. On the other hand, in the latter method, high measurement accuracy can be achieved, but large crystal grains cannot be measured.

(a) Grain Counting Method (Cut Method)

The method is essentially according to the following two methods:

Method of measuring austenite crystal grain size of steel (JIS G 0551 (1977))

Method of measuring ferrite crystal grain size of steel (JIS G 0552 (1977))

$$n = 500 \left(\frac{M}{100}\right)^2 \left(\frac{I_1 \times I_2}{L_1 \times L_2}\right)$$

$$N = \frac{\log n}{0.301} + 1$$

$$n' = 2^{N+3}$$

wherein:
n: Number of crystal grains in a 25-mm² area seen at a magnification of 100.
M: Magnification of a microscope.
$L_1$(or $L_2$): Total length of one of two vertically rectangular lines (unit:mm).
$I_1$ (or $I_2$): Total number of crystal grains cut by $L_1$ or $L_2$.

n' is compared with a standard grain size shown by JIS G 0551 or JIS G 0552 to determine an average crystal grain size.

(b) X-ray Method According to Scherrer's Formula:

$$t = \frac{K \cdot \lambda}{B \cos \theta_B}$$

$$B^2 = B_m^2 - B_0^2$$

t: Size of crystal grain.
K: Scherrer constant.
λ: Wavelength of X-ray.
$\theta_B$: Bragg's angle.
B: Broadening of X-ray diffraction peak (real value).
$B_m$: Broadening of X-ray diffraction peak (measured value).
$B_0$: Broadening of X-ray diffraction peak (due to apparatus, etc.).

The size of crystal grain is determined from t. By this method, a thickness in perpendicular to a plane (h, k, l) can be measured by measuring the broadening of a diffraction peak of a plane (h, k, l).

In the present invention, the crystal grain distribution should be such that 90% or more of the crystal grains have a grain size of 0.2 μm or less.

When the crystal grains having a grain size of 0.2 μm or less are less than 90%, coarse crystal grains experience reversal of magnetization at a high temperature, thereby showing poor heat resistance. The optimum results can be obtained when the magnet is constituted by uniform fine crystal grains having a grain size of 0.2 μm or less.

FIG. 1 schematically shows the growth of the crystal grain distributions. FIG. 1 (a) shows the alloy structure of the magnet of the present invention, in which fine crystal grains far smaller than the critical size of 0.3 μm for single domain particles are uniformly distributed with a small standard deviation σ. In this case, the reversal of magnetization is unlikely, because the rotation of the single magnetic domains is prevented by the crystal grain boundaries. FIG. 1 (b) shows the alloy structure in which fine crystal grains and coarse crystal grains coexist. The coarse crystal grains contain a plurality of magnetic domains. In this case, the reversal of magnetization easily takes place by the movement of domain walls. Accordingly, irreversible loss of flux takes place during increase in the ambient temperature. FIG. 1 (c) shows the alloy structure of a conventional magnet which is characterized by coarse crystal grains. The reversal of magnetization takes place extremely easily by the movement of domain walls, resulting in large irreversible loss of flux.

In the production of the magnet alloy, a melt of rare earth-iron-boron permanent magnet alloy having the above composition is rapidly quenched to provide a thin ribbon, powder or flakes, which have an initial coercive force iHc of 2000 Oe or less, preferably 1000 Oe or less at room temperature. When the coercive force of such thin ribbon, powder or flakes is 2000 Oe or less, the magnetizability and heat resistance of the magnet are not deteriorated even by a heat treatment utilized to make uniform the crystal grain size and the residual magnetic flux density Br.

For this purpose, the thin ribbon, powder or flakes are produced under the above rapid-quenching conditions.

The rapid quenching method which may be conducted on a melt of a rare earth-iron-boron permanent magnet alloy includes a centrifugal rapid-quenching method, in which an alloy melt is ejected onto an inner wall of a cooling drum rotating at a high speed to rapidly solidify the alloy melt, a single roll method in which an alloy melt is ejected onto a rotating roll; a double roll method in which an alloy melt is ejected into a gap between two drums rotating at a high speed, etc. In the production of powder, an atomizing method can be used, and the flakes can be produced by pulverizing the above thin ribbons, etc.

Next, a heat treatment at 800° C. or lower is conducted to provide the magnet alloy with good magnetizability and heat resistance free from non-uniformity of the crystal grain size and the residual magnetic flux density Br. The preferred temperature of the heat treatment is 550°–800° C. When it is lower than 550° C., the heat-treated magnet alloy is mainly composed of an isotropic, amorphous phase originally obtained by the rapid quenching method, showing poor magnetic properties. On the other hand, when it exceeds 800° C., the crystal grains generated by the heat treatment become too large, and the precipitation of heterogeneous phase takes place, resulting in a decrease in the coercive force iHc.

The heat-treated magnet alloy is then pulverized.

With respect to the average particle size of magnetic powder, when it is less than 1 μm, unnecessary oxidation and deterioration may be caused. On the other hand, when the average particle size exceeds 1000 μm, the moldability, feedability, packability and compressibility in forming of the bonded magnet becomes poor.

The magnet powder is then blended with a binder to provide the bonded magnet.

The binder utilized in such bonded magnets is usually resins such as epoxy resins, nylons, etc. When better heat resistance is required, metal binders may be used. In this case, rotation forging is effective.

When the binder content in the resulting bonded magnet is less than 5 volume %, the bonded magnet has a poor mechanical strength, and when it exceeds 40 volume %, the bonded magnet shows poor magnetic properties because of an increase in the non-magnetic portion.

The bonded rapid quench magnet having excellent magnetizability and heat resistance according to the present invention can be used for permanent magnet-type motors having extremely improved heat resistance.

The present invention will be explained in further detail by the following Examples.

EXAMPLE 1

A mother alloy of $Nd_{12.5}Fe_{79}B_{6.5}Al_2$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 30 μm in thickness by a single roll method (wheel surface velocity: 30 m/sec). The resulting thin ribbon in an as-rapidly quenched (as-R.Q.) state had an initial coercive force iHc of 550 Oe.

Next, the thin ribbon was placed in a vacuum furnace heated at 650° C. for 1 hour, and then taken out of the furnace and rapidly quenched by blowing Ar. The heat-treated thin ribbon had a coercive force iHc of 10.8 kOe. The heat-treated magnet alloy had an average crystal grain size of 0.045 μm, and 90% or more of the crystal grains had a grain size (diameter) of 0.1 μm or less when observed by a scanning-type electron microscope.

The heat-treated thin ribbon was pulverized to −30 mesh and then blended with an epoxy resin to provide a bonded rapid quench magnet.

This bonded magnet was magnetized at 20 kOe and evaluated with respect to magnetic properties, heat resistance and magnetizability. As a result, it was found that this bonded magnet had a residual magnetic flux density Br of 5.3 kG, a coercive force iHc of 10.8 kOe, an irreversible loss of flux of 1.8% at an ambient temperature of 140° C and at a permeance coefficient Pc of 2.0.

Incidentally, in this Example, the irreversible loss of flux was measured as follows:

First, a bonded magnet sample prepared from the heat-treated magnetic powder was machined to a shape showing Pc=2.0 (diameter: 12.55 mm, length: 8.25 mm), and magnetized at a magnetic field intensity of 20 kOe. The magnetized sample was measured with respect to open flux by a measurement apparatus comprising a Helmholtz coil and a digital magnetic flux meter, and the measured value of the open flux was named as an initial open flux. Next, the sample was kept in a constant-temperature container kept at 100° C. for 30 minutes (heating time: 10 minutes, keeping time at 100° C.: 30 minutes), and then cooled to room temperature to measure its open flux again. From the above two data, the irreversible loss of flux by heating at 100° C. was calculated. By elevating the heating temperature to 200° C. stepwise by 20° C., the irreversible loss of flux at each temperature was also measured.

EXAMPLE 2

A bonded magnet was prepared from a magnet powder having a composition of $Nd_\alpha Fe_{93.3-\alpha}B_{6.5}Si_{0.2}$ (by atomic %) in the same manner as in Example 1 to examine the relations between an Nd content and a residual magnetic flux density Br, an irreversible loss of flux, a coercive force iHc and magnetizability. The results are shown in FIG. 2. When the Nd content is less than 10 atomic %, the irreversible loss of flux was more than 5% at an ambient temperature of 140° C. and at a Pc of 2. And when the Nd content exceeds 15 atomic %, the residual magnetic flux density Br becomes less than 4.5 kG, meaning that permanent magnets having excellent magnetic properties cannot be obtained outside the Nd content range of 10–15 atomic %.

The magnetizability in FIG. 2 is defined by the following formula:

Magnetizability=Br (20 kOe)/Bs (30 kOe), wherein Br (20 kOe) means Br when magnetized at a magnetic field intensity of 20 kOe, and Bs (30 kOe) means a saturation magnetic flux density Bs when completely magnetized at a magnetic field intensity of 30 kOe.

EXAMPLE 3

Figure 3:
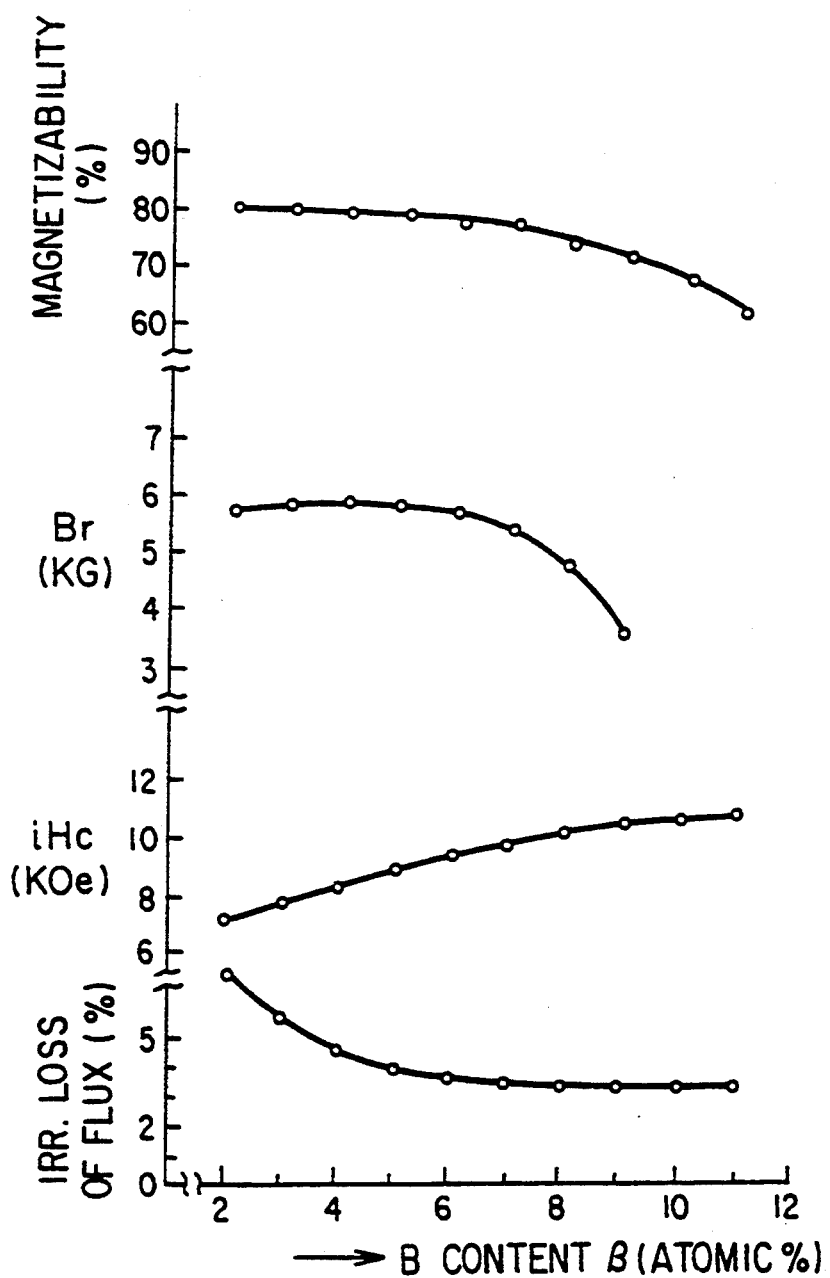
FIG. 3 is a graph showing the relations between an Nd content of the magnet $Nd_{12.5}Fe_{87.3-\beta}B_{\beta}Si_{0.2}$ (by atomic %) of the present invention and magnetic properties.

With respect to a bonded rapid quench magnet having a composition of $Nd_{12.5}Fe_{87.3-\beta}B_\beta Si_{0.2}$ (by atomic %), the relations between a B content and a residual magnetic flux density Br, an irreversible loss of flux, a coercive force iHc and magnetizability are shown in FIG. 3. As is clear from FIG. 3, when the B content is lower than 4 atomic %, the irreversible loss of flux is more than 5% at an ambient temperature of 140° C., and when it exceeds 8 atomic %, the residual magnetic flux density Br becomes lower than 4.5 kG, meaning that permanent magnets having excellent magnetic properties cannot be obtained outside the B content range of 4–8 atomic %.

EXAMPLE 4

A mother alloy of $Nd_{10.5}Fe_{83.5}B_4Si_2$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 10 μm in thickness by a single roll method (wheel surface velocity: 20 m/sec). The resulting thin ribbon in an as-rapidly quenched (as-R.Q.) state had an initial coercive force iHc of 730 Oe.

Next, the thin ribbon was placed in a vacuum furnace heated at 650° C. for 1 hour, and then taken out of the furnace and rapidly quenched by blowing Ar. The heat-treated thin ribbon had a coercive force iHc of 9.5 kOe. The heat-treated magnet alloy had an average crystal grain size of 0.07 μm, and 90% or more of the crystal grains had a grain size (diameter) of 0.15 μm or less when observed by a scanning-type electron microscope.

The heat-treated thin ribbon was pulverized to −30 mesh and then blended with an epoxy resin to provide a bonded rapid quench magnet.

This bonded magnet was magnetized at 20 kOe and evaluated with respect to magnetic properties, heat resistance and magnetizability. As a result, it was found that this bonded magnet had a residual magnetic flux density Br of 5.5 kG, a coercive force iHc of 9.5 kOe, and an irreversible loss of flux of 4.0% at an ambient temperature of 140° C and at a permeance coefficient Pc of 2.0.

EXAMPLE 5

A mother alloy of $Nd_{15}Fe_{76}B_{6.5}Co_{2.5}$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 40 μm in thickness by a single roll method (wheel surface velocity: 30 m/sec). The resulting thin ribbon in an as-rapidly quenched (as-R.Q.) state had an initial coercive force iHc of 300 Oe.

Next, the thin ribbon was placed in a vacuum furnace heated at 650° C. for 1 hour, and then taken out of the furnace and rapidly quenched by blowing Ar. The heat-treated thin ribbon had a coercive force iHc of 12.5 kOe. The heat-treated magnet alloy had an average crystal grain size of 0.09 μm, and 90% or more of the crystal grains had a grain size (diameter) of 0.15 μm or less when observed by a scanning-type electron microscope.

The heat-treated thin ribbon was pulverized to −30 mesh and then blended with an epoxy resin to provide a bonded rapid quench magnet.

This bonded magnet was magnetized at 20 kOe and evaluated with respect to magnetic properties, heat resistance and magnetizability. As a result, it was found that this bonded magnet had a residual magnetic flux density Br of 5.3 kG, a coercive force iHc of 12.5 kOe, and an irreversible loss of flux of 2.4% at an ambient temperature of 140° C. and at a permeance coefficient Pc of 2.0.

EXAMPLE 6

A mother alloy of $Nd_{12.5}Fe_{79}B_{6.5}Nb_2$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 30 μm in thickness by a single roll method (wheel surface velocity: 30 m/sec). The resulting thin ribbon in an as-rapidly quenched (as-R.Q.) state had an initial coercive force iHc of 120 Oe.

Next, the thin ribbon was placed in a vacuum furnace heated at 700° C. for 1 hour, and then taken out of the furnace and rapidly quenched by blowing Ar. The heat-treated thin ribbon had a coercive force iHc of 16.0 kOe. The heat-treated magnet alloy had an average crystal grain size of 0.075 μm, and 90% or more of the crystal grains had a grain size (diameter) of 0.10 μm or less when observed by a scanning-type electron microscope.

The heat-treated thin ribbon was pulverized to −30 mesh and then blended with an epoxy resin to provide a bonded rapid quench magnet.

This bonded magnet was magnetized at 25 kOe and evaluated with respect to magnetic properties, heat resistance and magnetizability. As a result, it was found that this bonded magnet had a residual magnetic flux density Br of 5.1 kG, a coercive force iHc of 16.0 kOe, and an irreversible loss of flux of 0.5% at an ambient temperature of 140° C. and at a permeance coefficient Pc of 2.0.

Figure 4:
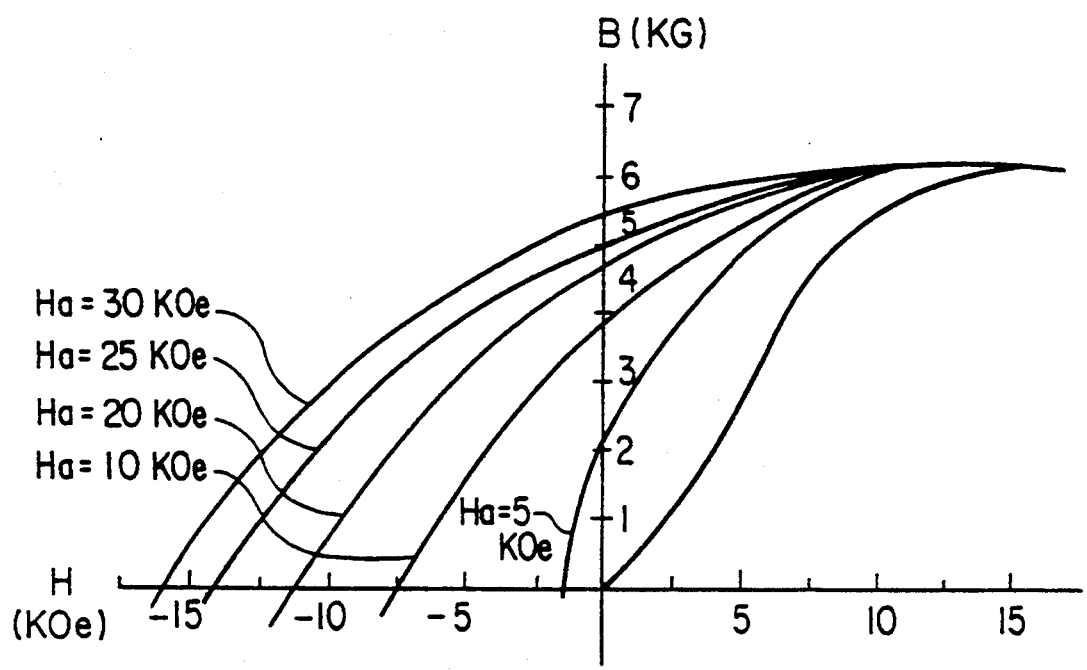
FIG. 4 is a graph showing the demagnetization curves varying with a magnetic field intensity as a parameter.

FIG. 4 is a graph showing the demagnetization curves varying with a magnetic field intensity $H_a$ as a parameter. It is clear from FIG. 4 that this bonded magnet shows excellent magnetizability because its coercive force iHc is lower than 20 kOe when magnetized at a magnetic field intensity of 30 kOe.

EXAMPLE 7

A mother alloy of $Nd_{11}Fe_{77}B_{6.5}Co_5Al_{0.5}$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 50 μm in thickness by a single roll method (wheel surface velocity: 40 m/sec). The resulting thin ribbon in an as-rapidly quenched (as-R.Q.) state had an initial coercive force iHc of 1300 Oe.

Next, the thin ribbon was placed in a vacuum furnace heated at 650° C. for 1 hour, and then taken out of the furnace and rapidly quenched by blowing Ar. The heat-treated thin ribbon had a coercive force iHc of 9.0 kOe. The heat-treated magnet alloy had an average crystal grain size of 0.06 μm, and 90% or more of the crystal grains had a grain size (diameter) of 0.12 μm or less when observed by a scanning-type electron microscope.

The heat-treated thin ribbon was pulverized to −30 mesh and then blended with an epoxy resin to provide a bonded rapid quench magnet.

This bonded magnet was magnetized at 20 kOe and evaluated with respect to magnetic properties, heat resistance and magnetizability. As a result, it was found that this bonded magnet had a residual magnetic flux density Br of 5.6 kG, a coercive force iHc of 9.0 kOe, and an irreversible loss of flux of 4.5% at an ambient temperature of 140° C. and at a permeance coefficient Pc of 2.0.

EXAMPLE 8

A mother alloy of $Nd_{12.5}Fe_{80.2}B_{6.5}Si_{0.8}$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 30 μm in thickness by a single roll method (wheel surface velocity: 30 m/sec). The resulting thin ribbon in an as-rapidly quenched (as-R.Q.) state had an initial coercive force iHc of 850 Oe.

Next, the thin ribbon was placed in a vacuum furnace heated at 550° C. for 1 hour, and then taken out of the furnace and rapidly quenched by blowing Ar. The heat-treated thin ribbon had a coercive force iHc of 7.5 kOe. The heat-treated magnet alloy had an average crystal grain size of 0.04 μm, and 90% or more of the crystal grains had a grain size (diameter) of 0.08 μm or less when observed by a scanning-type electron microscope.

The heat-treated thin ribbon was pulverized to −30 mesh and then blended with an epoxy resin to provide a bonded rapid quench magnet.

This bonded magnet was magnetized at 20 kOe and evaluated with respect to magnetic properties, heat resistance and magnetizability. As a result, it was found that this bonded magnet had a residual magnetic flux density Br of 5.3 kG, a coercive force iHc of 10.2 kOe, and an irreversible loss of flux of 4.3% at an ambient temperature of 140° C. and at a permeance coefficient Pc of 2.0.

EXAMPLE 9

A mother alloy of $Nd_{12.5}Fe_{78.7}B_8Si_{0.8}$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 10 μm in thickness by a single roll method (wheel surface velocity: 30 m/sec). The resulting thin ribbon in an as-rapidly quenched (as-R.Q.) state had an initial coercive force iHc of 1300 Oe.

Next, the thin ribbon was placed in a vacuum furnace heated at 800° C. for 1 hour, and then taken out of the furnace and rapidly quenched by blowing Ar. The heat-treated thin ribbon had a coercive force iHc of 12.0 kOe. The heat-treated magnet alloy had an average crystal grain size of 0.11 μm, and 90% or more of the crystal grains had a grain size (diameter) of 0.15 μm or less when observed by a scanning-type electron microscope.

The heat-treated thin ribbon was pulverized to −30 mesh and then blended with an epoxy resin to provide a bonded rapid quench magnet.

This bonded magnet was magnetized at 20 kOe and evaluated with respect to magnetic properties, heat resistance and magnetizability. As a result, it was found that this bonded magnet had a residual magnetic flux density Br of 5.0 kG, a coercive force iHc of 12.0 kOe, and an irreversible loss of flux of 3.0% at an ambient temperature of 140° C. and at a permeance coefficient Pc of 2.0.

EXAMPLE 10

The bonded magnets produced in Example 1 in the form of a segment were mounted in a yoke having an outer diameter of 60 mm and an inner diameter of 54 mm such that the magnetic poles of the segment magnets have magnetic anisotropy circumferentially, to produce a motor for operating an automobile wiper having a rotor diameter of 49 mm and a gap of 0.5 mm. Incidentally, the bonded magnets were magnetized at 25 kOe. For comparison, a wiper having the same structure was producing by using bonded magnets having a composition of $Nd_{9.9}Fe_{81.6}B_{6.5}Al_2$ (by atomic %).

In both cases, the permeance coefficient was 2. An ambient temperature at which the irreversible loss of flux decreased to 5% was 100° C. in the comparative case, while it was 200° C. in the case of this Example (the present invention), which was higher than the comparative case by 100° C.

EXAMPLE 11

A cylindrical magnet having an outer diameter of 20 mm and an inner diameter of 18 mm was prepared from the bonded magnet produced in Example 1, and an outer surface of the cylindrical magnet was provided with 24 magnetic poles. The magnetic field for magnetizing the cylindrical magnet was 20 kOe.

The resulting stepping motor magnet had a surface magnetic flux density of 2200 G. For comparison, a cylindrical magnet having the same structure was produced from $Nd_{9.9}Fe_{81.6}B_{6.5}Al_2$ (by atomic %). It showed a surface magnetic flux density of only 1400 G, which was lower than this Example by 800 G.

EXAMPLE 12

A cylindrical magnet having an outer diameter of 20 mm and an inner diameter of 18 mm was prepared from the bonded magnet produced in Example 1, and an inner surface of the cylindrical magnet was provided with 8 magnetic poles. The magnetic field for magnetizing the cylindrical magnet was 20 kOe.

The resulting HDD spindle motor magnet had a surface magnetic flux density of 3500 G. For comparison, a cylindrical magnet having the same structure was produced from $Nd_{9.9}Fe_{81.6}B_{6.5}Al_2$ (by atomic %). It showed a surface magnetic flux density of only 2800 G, which was lower than this Example by 700 G.

EXAMPLE 13

A mother alloy of $Nd_{12.5}Fe_{79.5}B_{6.5}Nb_{1.5}$ (by atomic %) was prepared by arc melting, and ejected through a quartz nozzle in an Ar atmosphere at an atmospheric pressure while being subjected to high-frequency melting, to produce about 200 g of a thin ribbon of 5 mm in width and about 30 μm in thickness by a single roll method (wheel surface velocity: 30 m/sec). The resulting thin ribbon in an as-rapidly quenched (as-R.Q.) state had an initial coercive force iHc of 300 Oe.

Next, the thin ribbon was placed in a vacuum furnace heated at 660° C. for 1 hour, and then taken out of the furnace and rapidly quenched by blowing Ar. The heat-treated thin ribbon had a coercive force iHc of 14.0 kOe. The heat-treated magnet alloy had an average crystal grain size of 0.07 μm, and 90% or more of the crystal grains had a grain size (diameter) of 0.12 μm or less when observed by a scanning-type electron microscope.

The heat-treated thin ribbon was pulverized to a particle size of 500 μm. The magnet powder was blended with an epoxy resin to provide a bonded rapid quench magnet.

This bonded magnet was magnetized at 19.5 kOe and evaluated with respect to magnetic properties, heat resistance and magnetizability. Incidentally, samples were prepared such that they had a permeance coefficient Pc of 2.0.

COMPARATIVE EXAMPLES 1–3

R—Fe—B magnets having various compositions were prepared by the known methods.

Figure 5:
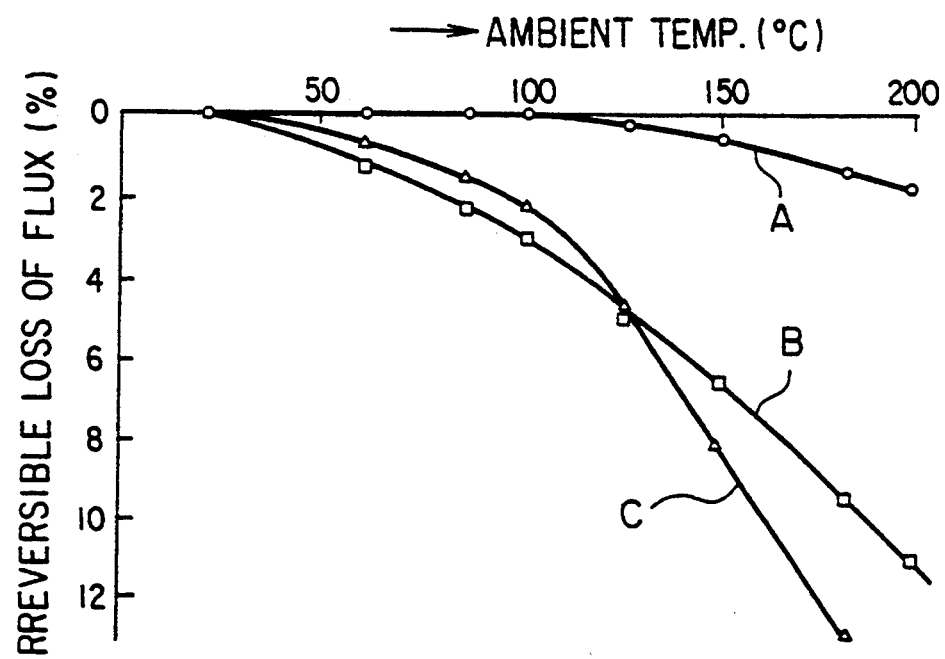
FIG. 5 is a graph showing the relations between an irreversible loss of flux and an exposure temperature.

FIG. 5 is a graph showing the relations between an irreversible loss of flux and an ambient temperature in the present invention and Comparative Examples. In FIG. 5, "A" shows the magnet of Example 13, "B" shows a conventional rapid quench magnet (Comparative Example 1), and "C" shows an anisotropic bonded magnet (Comparative Example 2). It is clear from FIG. 5 that the bonded magnet (A) produced by the rapid-quenching method according to the present invention had extremely good heat resistance.

In Comparative Example 1, magnetically isotropic bonded magnet (B) was produced according to a method shown in Example 1 of Japanese Patent Laid- Open No. 59-211549 as a conventional rapid quenching method. Incidentally, the alloy composition was 20% Nd, 76% Fe and 4% B by atomic %, which is outside the range of the present invention in Nd.

In Comparative Example 2, magnetically anisotropic bonded magnet (C) was produced according to a method shown in Example 1 of Japanese Patent Laid-Open No. 63-232301. Incidentally, the alloy composition was 17% Nd, 75% Fe and 8% B by atomic %, which is outside the range of the present invention in Nd.

In Comparative Example 3, sintered magnet ("D" in FIG. 6) was produced according to a method shown in Example of Japanese Patent Publication No. 61-34342. Incidentally, the alloy composition was 14% Nd, 79% Fe and 7% B by atomic %. Although the alloy composition of the magnet is within the range of the present invention, the magnet of Comparative Example 3 is extremely different from that of Example 13 with respect to an average crystal grain size. In addition, in the sintered magnet (D), Nd-rich phases are trapped between dendrites contained in an ingot, so that this structure remains in the final product. On the other hand, in the rapid quenching method according to the present invention, the Nd-phases are uniformly and finely dispersed in the magnet structure.

EXAMPLE 14

Figure 6:
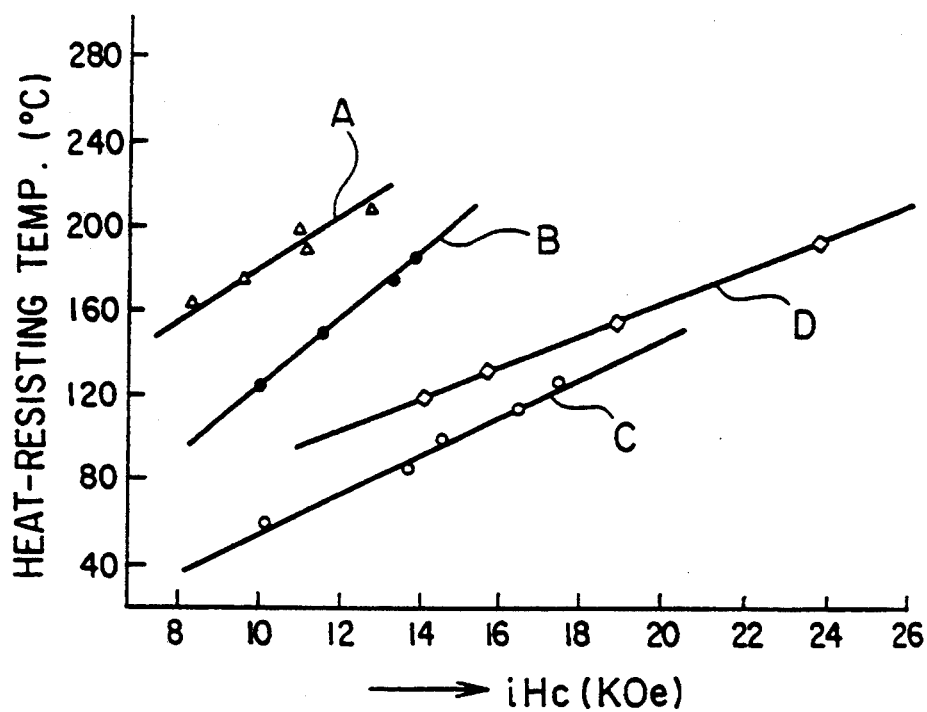
FIG. 6 is a graph showing the relations between a coercive force iHc and a heat-resisting temperature.

Samples having various coercive forces were produced in the same manner as in Example 13. For comparison, the same magnets (B–D) as in Comparative Examples 1–3 were also produced. They were evaluated with respect to heat-resisting temperature varying with a coercive force. The results are shown in FIG. 6. Here, the heat-resisting temperature is defined as an ambient temperature at which the irreversible loss of flux becomes 5% at a permeance coefficient of 2. It is clear from FIG. 6 that the bonded magnet of this Example shows extremely high heat-resisting temperature despite its low coercive force.

Figure 7:
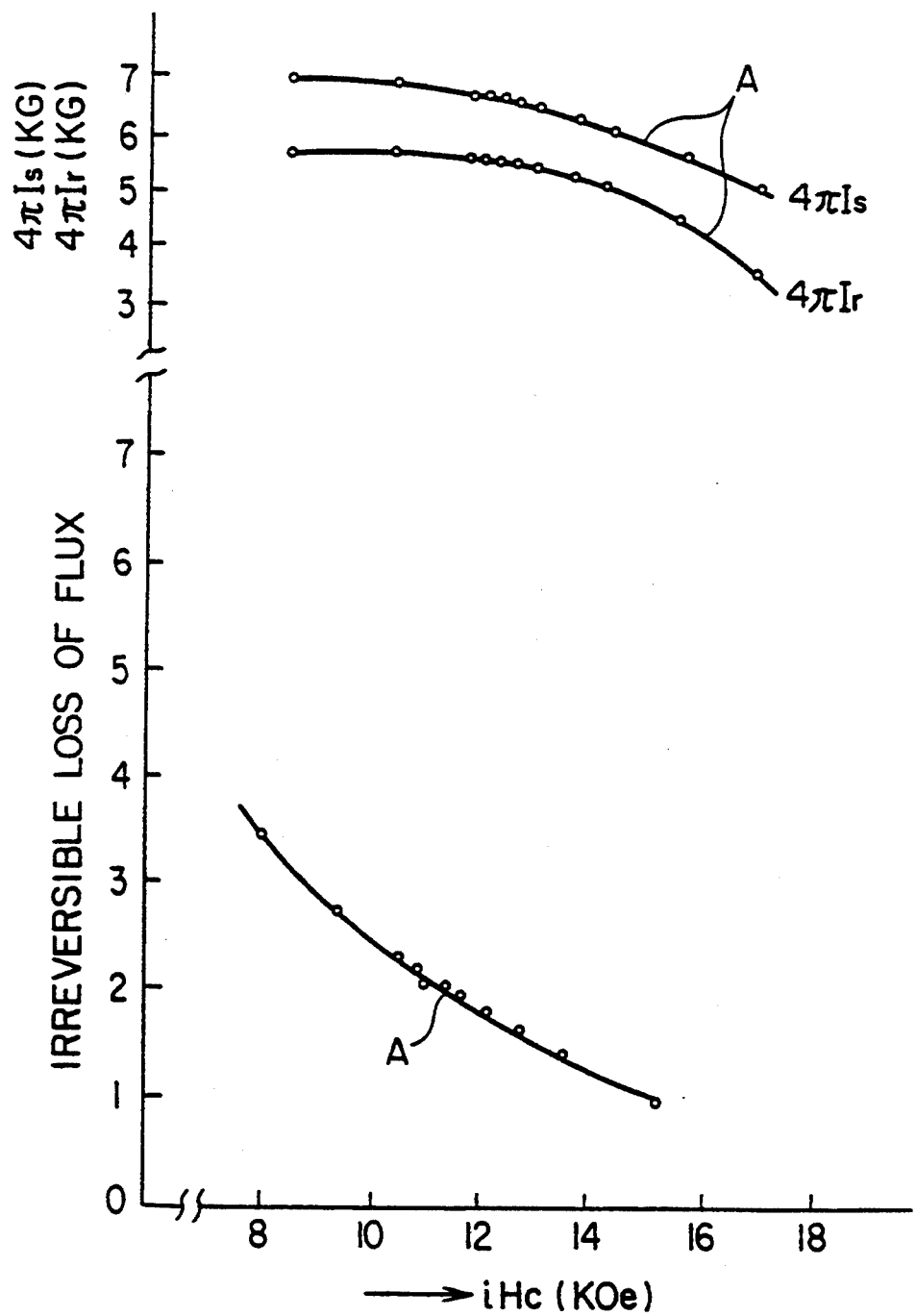
FIG. 7 is a graph showing the relations between a coercive force iHc and magnetizability and an irreversible loss of flux.

FIG. 7 shows the relations between a coercive force iHc and magnetizability and an irreversible loss of flux with respect to the magnet of this Example. It is clear from FIG. 7 that the isotropic bonded magnet of this Example shows good magnetizability as its coercive force iHc decreases. Thus, since the coercive force iHc can be decreased in the present invention, the bonded magnet can have both satisfactory magnetizability and heat resistance.

EXAMPLE 15

In order to examine influences of the shapes of the rapidly quenched thin flakes on heat resistance, the as-R.Q. thin flakes were examined with respect to magnetic properties, X-ray diffraction pattern.

Samples (No. 1–4, 5–8) having various formulations shown in Table 1 were melted in a vacuum furnace and then formed into thin flakes under the conditions shown in Table 2. Sample Nos. 1–4 were rapidly quenched at the wheel surface velocity of 22 m/sec, and Sample Nos. 5–8 were rapidly quenching at the wheel surface velocity of 9 m/sec.

Next, to prevent oxidation during the heat treatment, each sample was wrapped in an Nb foil and a stainless steel (SUS) foil, and subjected to a heat treatment at 650° C. for 2 hours in vacuum.

As-R.Q. thin flakes and heat-treated thin flakes were used to prepare bonded magnets by the following method.

In the first step, thin flakes were crashed into −32 mesh powder, and then 95 weight % of magnet powder, 3.5 weight % of an epoxy resin, 0.75 weight % of a hardening agent and 0.75 weight % of alcohol were mixed, and subjected to compression molding. The resulting moldings were then hardened.

The isotropic bonded magnets thus produced were measured with respect to an irreversible loss of flux. After that, each sample was magnetized at 25 kOe to measure its magnetic properties. Similarly, bonded magnet samples produced by using as-R.Q. magnet powder were magnetized at 25 kOe to measure their magnetic properties. The magnetic properties were determined from $4\pi$I-H curves produced by an automatic magnetic flux meter.

With respect to the samples, their crystal grain sizes were measured by an X-ray method (powder method). Each sample was produced by pulverizing the as-R.Q. thin flakes to −32 mesh, mixing them with ethylene glycol and then applying the mixture onto a X-ray glass holder.

Table 1 shows the formulations (by atomic %) of the magnets, coercive forces of the as-R.Q. magnet alloys, irreversible loss of flux and magnetic properties of the heat-treated bonded magnets.

Figure 8:
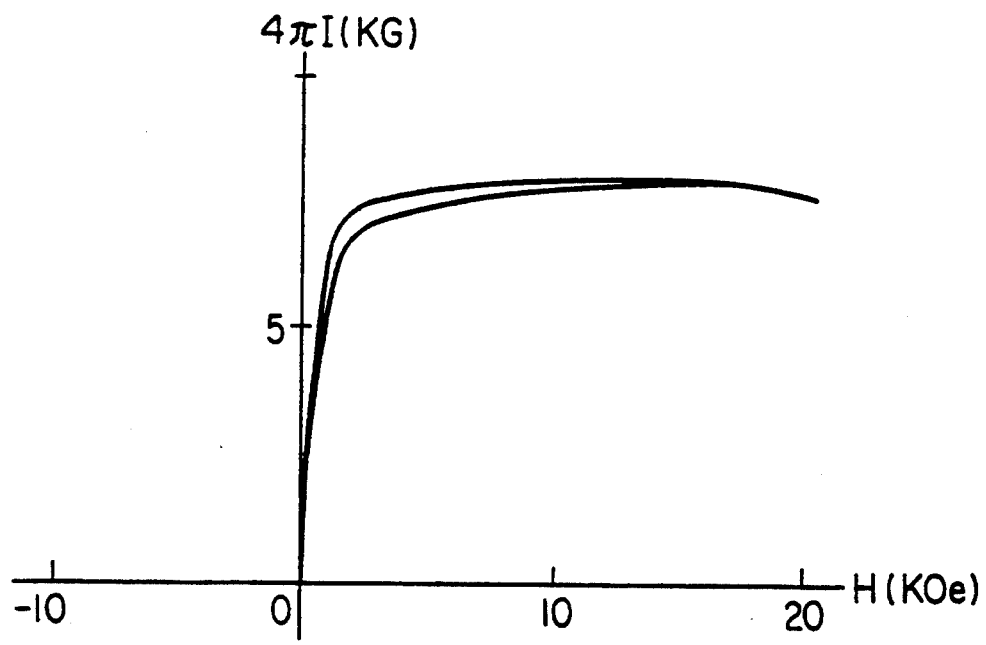
FIG. 8 is a graph showing the 4πI—H curve of the as-R.Q. magnet $Nd_{11.8}Fe_{80.2}B_{6.5}Nb_{1.5}$ (by atomic %) in the present invention.

In Table 1, Sample Nos. 1–4 show good heat resistance, and Sample Nos. 5–8 show poor heat resistance. FIG. 8 shows a $4\pi$I-H curve of Sample No. 1 (as R.Q.) having good heat resistance, and FIG. 9 shows a $4\pi$I-H curve of Sample No. 6 (as R.Q.) having poor heat resistance.

Figure 9:
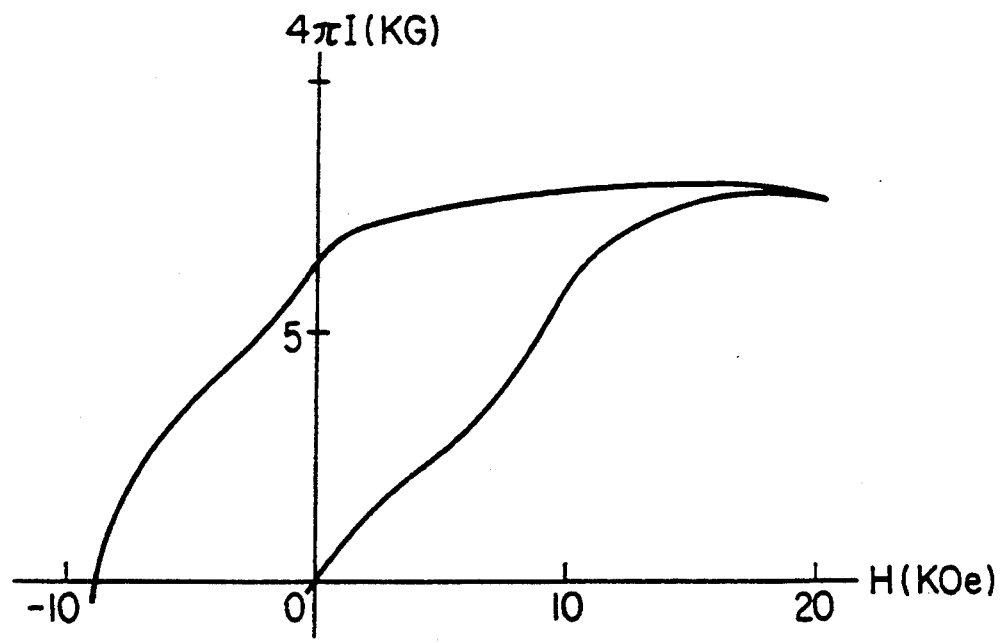
FIG. 9 is a graph showing the 4πI—H curve of the as-R.Q. magnet $Nd_{12.3}Fe_{80.2}B_{6.5}Nb_{1.0}$ (by atomic %) in Comparative Example.

It is clear from FIGS. 8 and 9 that the sample having good heat resistance does not substantially have a coercive force iHc in an as-R.Q. state, and that its initial magnetization curve is steep. On the other hand, the sample having poor heat resistance has a relatively large coercive force in an as-R.Q. state, and shows a smaller rise in an initial magnetization curve.

Figure 10:
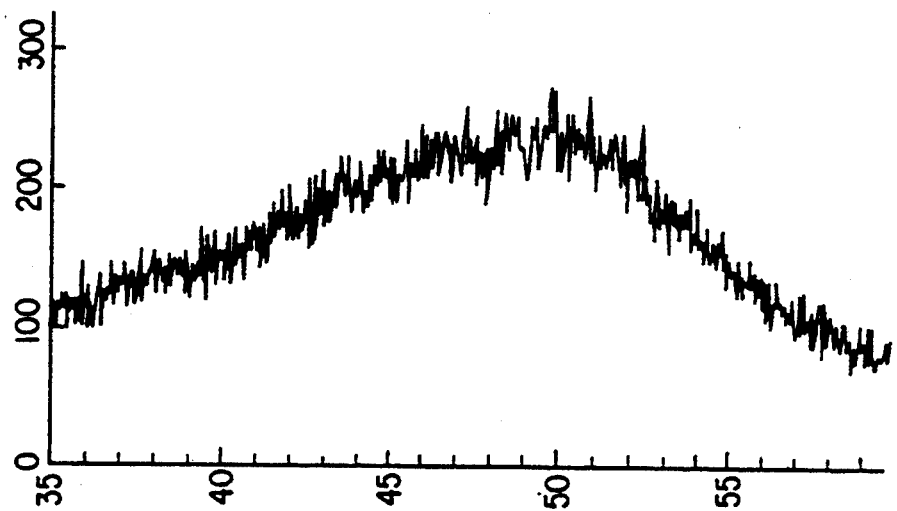
FIG. 10 is a graph showing an X-ray diffraction pattern of the magnet $Nd_{11.8}Fe_{80.2}B_{6.5}Nb_{1.5}$ (by atomic %) in the present invention.
Figure 11:
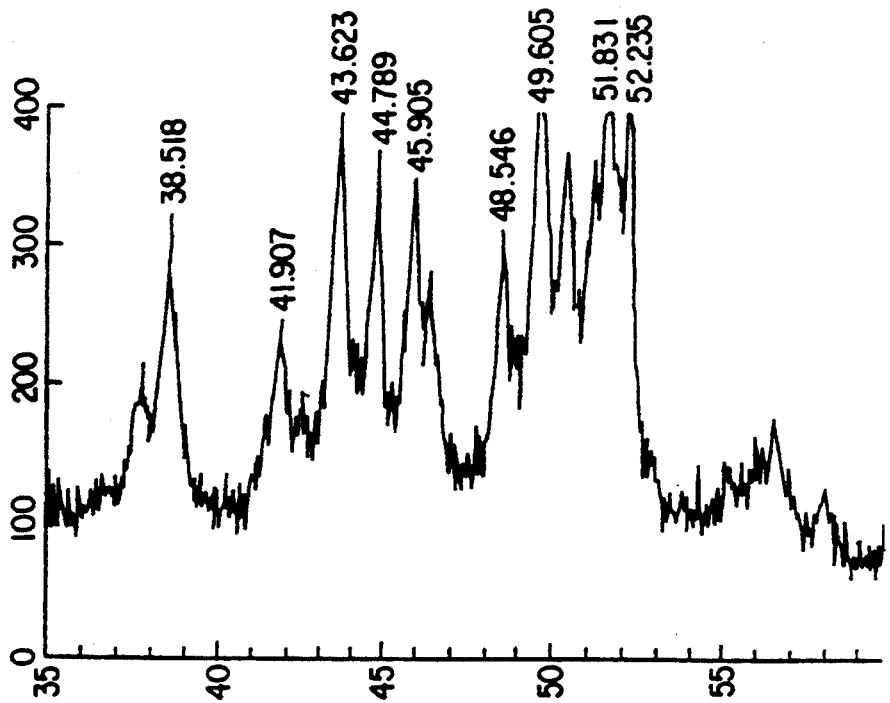
FIG. 11 is a graph showing an X-ray diffraction pattern of the magnet $Nd_{12.3}Fe_{80.2}B_{6.5}Nb_{1.0}$ (by atomic %) in Comparative Example.

As shown in FIG. 10, the sample having good heat resistance does not show X-ray diffraction peaks, while the sample having poor heat resistance shows X-ray diffraction peaks assignable to $Nd_2Fe_{14}B$ as shown in FIG. 11. This means that the sample having good heat resistance is almost amorphous in an as-R.Q. state, while the sample having poor heat resistance contains crystalline phases in an as-R.Q. state.

TABLE 1

| | Alloy composition (atomic %) | | | | iHc[1] | Irreversible Loss of Flux (%) | | |
|---|---|---|---|---|---|---|---|---|
| No. | Nd | Fe | B | Nb | (Oe) | at 140° C. | at 160° C. | at 200° C. |
| 1 | 11.8 | 80.2 | 6.5 | 1.5 | 147 | — | 2.4 | 5.1 |
| 2 | 12.3 | 79.7 | 6.5 | 1.5 | 293 | — | 1.7 | 3.5 |
| 3 | 12.8 | 79.2 | 6.5 | 1.5 | 184 | 0.7 | 1.2 | 2.5 |
| 4 | 12.3 | 80.2 | 6.5 | 1.0 | 159 | — | 2.0 | 4.0 |
| 5 | 11.8 | 80.2 | 6.5 | 1.5 | 4200 | — | 16.4 | 22.5 |
| 6 | 12.3 | 80.2 | 6.5 | 1.0 | 9217 | — | 5.9 | 7.7 (180° C.) |
| 7 | 12.3 | 80.2 | 6.5 | 1.0 | 9229 | — | 11.7 | 14.0 (180° C.) |
| 8 | 12.8 | 79.2 | 6.5 | 1.5 | 1800 | 5.3 | — | — |

| | | Magnetic Properties | | | | | |
|---|---|---|---|---|---|---|---|
| No. | Density (g/cm³) | $4\pi$Is (G) | $4\pi$Ir (G) | bHc (Oe) | iHc (Oe) | $H_K$ (Oe) | $(BH)_{max}$ (MGOe) |
| 1 | 6.08 | 7680 | 6110 | 5300 | 10780 | 3880 | 8.13 |
| 2 | 6.05 | 7490 | 5930 | 5310 | 13270 | 4750 | 7.84 |

TABLE 1-continued

| 3 | 6.11 | 7090 | 5910 | 5300 | 14400 | 5150 | 7.8 |
| 4 | 6.03 | 7560 | 6090 | 5340 | 12900 | 4000 | 8.13 |
| 5 | 6.17 | 7800 | 5400 | 2980 | 5850 | 880 | 4.29 |
| 6 | 6.15 | 7980 | 6680 | 5710 | 11610 | 4120 | 9.70 |
| 7 | 6.14 | 7690 | 6010 | 4520 | 10680 | 1880 | 6.90 |
| 8 | 6.11 | 7070 | 5810 | 4850 | 13350 | 3000 | 7.1 |

Note (1): as R.Q.

TABLE 2

| | Wheel Surface Velocity | Material of Roll |
|---|---|---|
| Sample Nos. 5–8 | 9 m/sec | Beryllium-Copper Alloy |
| Sample Nos. 1–4 | 25 m/sec | Copper Roll Provided with 1 mm-Thick Hard Chromium Plating |

EXAMPLE 16

A rapidly quenched thin ribbon was produced from an alloy melt of $Nd_{12.5}Fe_{79}B_{6.5}Nb_2$ (by atomic %) by the method shown in Example 15 using a copper roll.

Figure 12:
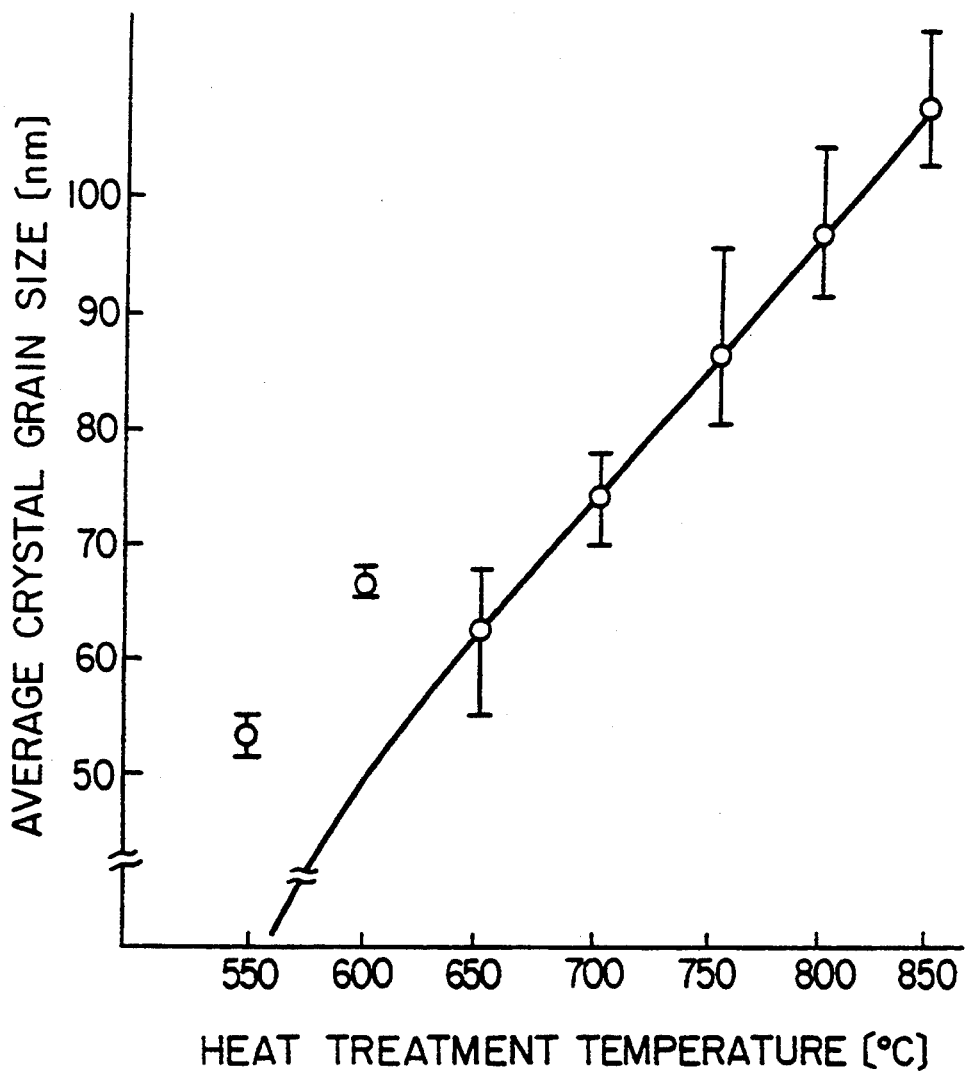
FIG. 12 is a graph showing the relations between a heat treatment temperature and an average crystal grain size.

The thin ribbon was subjected to a heat treatment at a temperature from 500° C. to 850° C. stepwise by 50° C. to examine the relations between the heat treatment temperature and the average crystal grain size. The results are shown in FIG. 12. At 500° C., good magnetic properties cannot be obtained because the magnet alloy structure was mostly occupied by an amorphous phase. When the heat-treating temperature exceeds 800° C., the crystal grains became undesirably coarse, and heterogeneous phases were precipitated. Incidentally, the grain size was determined by the cut method.

EXAMPLE 17

The alloy magnet powder prepared in Example 15 was mixed with 8 volume % of a polyamide resin to produce a bonded magnet of 8 mm in outer diameter and 5.5 mm in inner diameter. The bonded magnet was provided with 10 magnetic poles with the same interval to provide a rotor for a pulse motor. For comparison, a rotor having the same structure was produced from $Nd_{13}Fe_{81}B_6$ (by atomic %) to provide a pulse motor.

The average crystal grain size was 0.06 μm in this Example and 0.6 μm in the comparative magnet. In the comparative case, the average crystal grain size is larger than this Example by one order, since the comparative magnet does not contain Nb, etc. which function to generate nuclei for crystallization, and since its cooling speed is not sufficiently high due to use of the conventional roll, resulting in high iHc after rapid quenching. In other words, the crystal grains grew more than a critical size of a single magnetic domain.

Table 3 shows the performance of pulse motors. It is clear from Table 3 that the pulse motor of the present invention shows high torque not only at room temperature but also after heating to 150° C.

TABLE 3

| | at Room Temp. | (unit: g · cm) After Exposed at 150° C. |
|---|---|---|
| Present Invention | 106 | 100 |
| Comparative Magnet | 83 | 61 |

As described in detail above, according to the present invention, magnets having excellent magnetizability and heat resistance without deterioration in their magnetic properties can be obtained. Since the magnets of the present invention have good magnetizability, they can be magnetized at a relatively low magnetic field intensity. Accordingly, the magnets of the present invention can be utilized in various applications such as assembled magnets, ring magnets, etc.

In addition, since the magnets of the present invention have good heat resistance, they can be used in a high-temperature environment. By using the magnets of the present invention, permanent magnet-type motors, such as motors for automobiles, stepping motors, brushless motors, etc. can be obtained.

What is claimed is:

1. A bonded magnet having improved magnetizability and heat resistance comprising (a) magnetically isotropic magnetic powder composed of an R—Fe—B—M magnet alloy, wherein R represents at least one rare earth element including Y in the range of 12.5–15 atomic %, B represents boron in the range of 4–8 atomic %, Fe represents iron in a balance amount, 20% or less of said iron being substituted by Co, and M represents at least one element selected from the group consisting of Nb, W, V, Mo and Ta in the range of 0.05–3 atomic %, and having an average crystal grain size of 0.01–0.15 μm, a crystal grain size of 0.2 μm or less in 90% or more by area of said crystal grains, and an average particle size of 1–1000 μm; and (b) 5–40 volume % of a binder, said bonded magnet having an irreversible loss of flux which is lower than 5% at an ambient temperature of 140° C. and at a permeance coefficient, Pc, equal to 2, said R—Fe—B—M magnet alloy being produced by forming from an alloy melt having said composition a thin ribbon having an initial coercive force of 2000 Oe or less by a rapid quenching and subjecting said thin ribbon to a heat treatment at 800° C. or lower.

2. The bonded magnet according to claim 1, wherein said M is Nb.

* * * * *